METHOD OF PRODUCING THIN WAFERS OF SEMICONDUCTOR MATERIALS

Filed May 21, 1958 2 Sheets-Sheet 1

INVENTORS.
JAMES J. DOHERTY
and RALPH B. SOPER
BY Elmer J. Nealon
ATTORNEY.

METHOD OF PRODUCING THIN WAFERS OF SEMICONDUCTOR MATERIALS

Filed May 21, 1958 2 Sheets-Sheet 2

INVENTORS.
JAMES J. DOHERTY
and RALPH B. SOPER
BY Elmer J. Nealon
ATTORNEY.

United States Patent Office 2,968,866
Patented Jan. 24, 1961

2,968,866

METHOD OF PRODUCING THIN WAFERS OF SEMICONDUCTOR MATERIALS

Ralph B. Soper, North Weymouth, and James J. Doherty, Dorchester, Mass., assignors, by mesne assignments, to Sylvania Electric Products Inc., Wilmington, Del., a corporation of Delaware Filed May 21, 1958, Ser. No. 736,911

5 Claims. (Cl. 29—417)

This invention relates to semiconductor materials for use in electrical translating devices, and more particularly to an improved method for producing thin, flat wafers from ingots of crystalline semiconductor material.

In the manufacture of semiconductor electrical translating devices, such as diodes and transistors of well known types, the active semiconductor elements employed therein must generally be in the form of small thin pieces or chips commonly known as dice. These dice are produced from blocks or ingots which result from the steps involved in purification, controlled addition of doping impurities, and formation of the initial semiconductor material into a single crystal structure. It is common practice to divide an ingot of appropriately prepared semiconductor material into slabs or wafers by repeatedly cutting through the ingot parallel to one face of the ingot. These slabs are subsequently reduced to the desired thickness and subdivided into dice of suitable lateral dimensions.

Many of the semiconductor materials suitable for electrical translating devices such as, for example, germanium and silicon, are characterized by their extreme hardness and brittleness. These physical characteristics have made extremely difficult the problem of efficiently obtaining the required minute semiconductor dice from ingots of these materials.

The division of ingots into thin, flat wafers generally is done with a rotating saw or cutting wheel, the periphery of which is charged with diamond particles. The action of the cutting wheel abrades the portion of the ingot in the path of the blade into sawdust, thus severing a wafer from the remainder of the ingot as the cutting wheel slices through the ingot. The cutting wheel is generally much thicker than the desired thickness of the semiconductor dice to be obtained. Therefore, for each wafer sliced from the ingot a portion of the ingot larger than the wafer is lost as sawdust. If the cutting wheel is reduced in thickness to reduce this loss of material, vibrations in the thin saw blade increase the incidence of shattering of wafers as well as saw blades.

Additional losses of material which further increase the inefficiency of the slicing operation occur because the wafers obtained normally are much thicker than required for the final dice. The excess material must be removed by grinding or etching the wafer to the proper thickness. Attempts to slice thinner wafers to reduce the amount of grinding or etching required result in an increased incidence of wafers being shattered by saw vibration. Still further losses of material occur from chipping of the semiconductor material as the saw first cuts into the ingot and from the formation of a bur as the wafer falls away from the ingot.

Despite the recognition of the foregoing problems involved in the production of slices or slabs from semiconductor material and the efforts which have been made to establish the most effective compromises as to thickness of slabs and saws employed, the operation has remained essentially an inefficient operation in that a relatively large amount of valuable raw material must be wasted to produce a relatively small amount of material in useful form. To afford an appreciation of the order of the loss of material involved, it may be pointed out that typical saw thicknesses for cutting the slabs are of the order of .020 inch. Slabs produced with these saws are of the order of 0.12 to .015 inch in thickness. These slabs normally are reduced by grinding or etching techniques to typical thicknesses of .002 to .006 inch employed in dice for semiconductor devices. It is thus obvious that even aside from the losses due to the sawing operation, very substantial losses of material have been suffered by virtue of the necessity for grinding or etching to the ultimate desired thickness from a slice thickness which can be practicably realized by sawing.

It is therefore an object of the invention to provide an improved method for producing thin, flat wafers from a mass or body of semiconductor material.

It is another object of the invention to provide for better utilization of semiconductor material in the manufacture of semiconductor electrical translators.

Briefly, the method of the invention includes the steps of coating the block or ingot of semiconductor material with a plastic material containing a curable resin, curing the plastic in situ on the surface of the semiconductor material, cutting repeatedly through the coating and the block of semiconductor material to produce slices of the material from the block, and then removing the thin band of plastic from the periphery of each of the slices. By virtue of the supporting effect afforded by the coating of plastic, which adheres firmly to the semiconductor material during the sawing operation, it is possible to produce much thinner slices of the material than was formerly possible. Furthermore, burs and chips formerly caused by the saw entering and leaving the ingot of semiconductor material are substantially eliminated.

It is an important feature of the invention to employ for the coating a plastic material which, in its cured state, is capable of absorbing moisture slowly, with accompanying expansion or swelling of the material. As will be pointed out hereinafter in more detail, this property makes possible the ready removal and disposal of the plastic coating after it has served its purpose in the slicing operation, without the need for employing elevated temperatures or organic solvents for the coating.

As a further feature of the invention, the plastic coating is capable of being cured to an insoluble, infusible state at relatively low temperatures. In view of the sensitivity of germanium and silicon crystals to thermal shock, it is preferable that the coating be curable at a reasonable rate at room temperatures or slightly above. Plastic coatings which are curable with the maintenance of temperatures of between about 20° C. and 50° C. are preferred.

Other objects, features, and advantages of the method of the invention will be apparent from a detailed discussion of the accompanying drawings wherein.

Throughout the drawings, various dimensions have been distorted out of proportion in the interest of clarity in presentation. In particular, the thickness of the semiconductor wafers is greatly exaggerated.

Figures 1, 2, 3, 4:
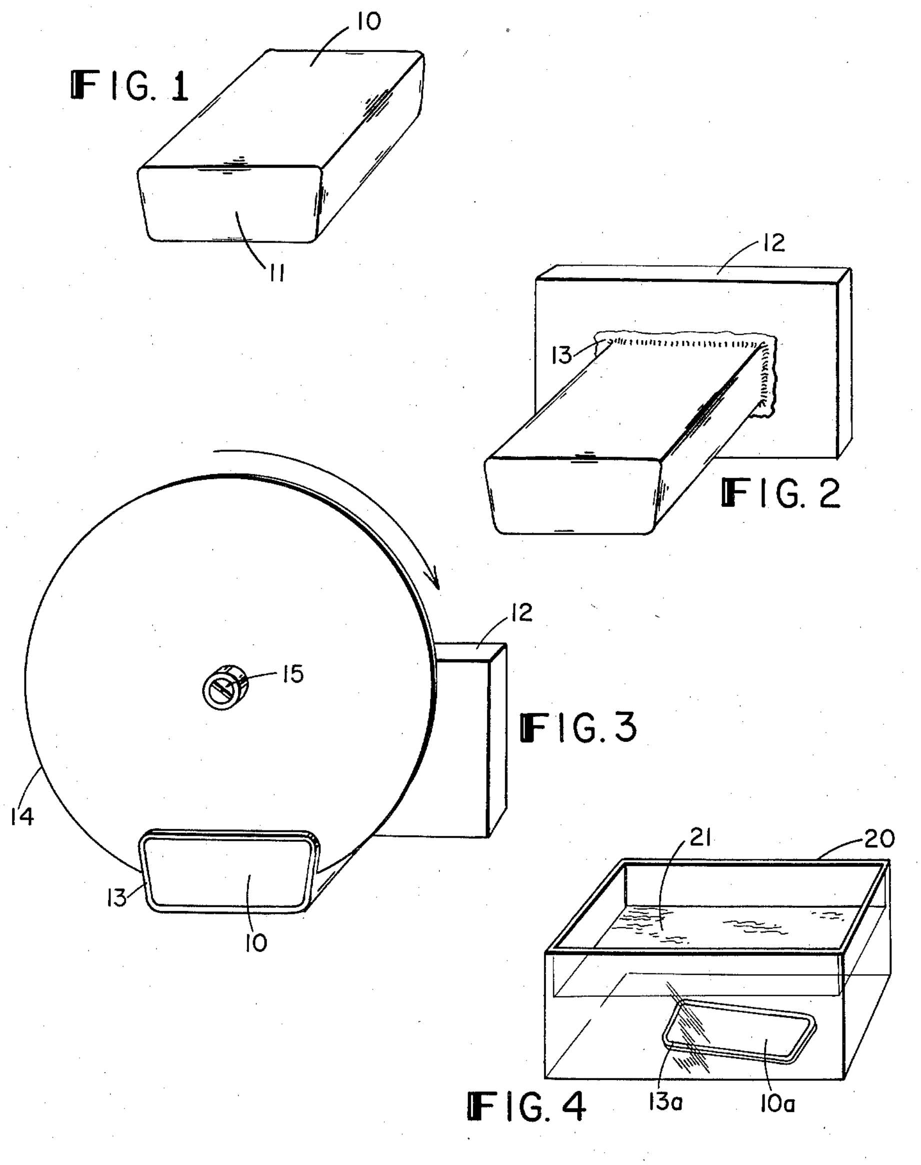
Fig. 1 is a perspective view of an ingot of semiconductor material as prepared for subdivision into wafers and dice.
Figs. 2 through 5 depict stages in the preparation of a flat, thin wafer from an ingot of semiconductor material according to the method of my invention.

A block or ingot of a single crystal semiconductor material such as, for example, germanium or silicon, is shown in Fig. 1. The ingot as shown is a section of a larger ingot prepared according to various well known techniques. The large ingot which typically has a cross-sectional area of about 1 to 1½ square inches is divided into easily manageable lengths of about 2 to 3 inches by a series of parallel cuts transverse to its longitudinal axis. The orientation of the cuts is done carefully in order to reveal the desired crystalline plane of the single crystal structure as at the end face 11.

Next, the ingot is bonded to a metal holding block 12, as shown in Fig. 2, and covered with a coating 13 of a thixotropic curable plastic. To bond the ingot to the block any suitable adhesive is employed to provide a very thin bonding layer between one end face of the ingot and the surface of the block so that the exposed face of the ingot lies substantially parallel to the surface of the block. Preferably, the adhesive should be of a type which does not require the application of heat to the ingot. The plastic material used for the coating may itself serve as a satisfactory bonding agent.

Plastic coatings of various compositions may be employed. Those having the physical characteristics typical of known types of electrical potting compounds are particularly useful. That is, the material should be sufficiently viscous to afford a coating of substantial thickness. Additionally it must be thixotropic or non-flowing in nature so that the coating will retain uniform thickness on vertical surfaces when the coated ingot is allowed to stand during the curing step. In general, suitable plastic coatings contain a resin such as, for example, a resin of the epoxy type and a filler capable of absorbing or adsorbing moisture at a limited rate. It may also be necessary to incorporate a component to improve the thixotropic nature of the plastic. Normally an agent for promoting the curing of the resin to an infusible condition is added just prior to the application of the material to the ingot.

The plastic coating is applied to the ingot as by dipping it into a mass of the prepared plastic. The ingot is thereby covered on its lateral surfaces which lie generally parallel to the longitudinal axis of the ingot. The holding block and coated ingot mounted thereon are then placed aside to permit the resin to cure at room temperature. If it is desired to increase the rate of curing, the assembly may be placed in a low temperature oven. However, temperatures of more than about 50° C. should be avoided to prevent possible damage to the semiconductor material.

After the resin has set to form a hard, adhering layer or skin about the ingot, the holding block with attached ingot is mounted in the slicing apparatus, not shown. The end face of the ingot is properly aligned with respect to the cutting wheel as shown in Fig. 3. The diamond-charged cutting wheel or saw 14, which is a commercially available type, is rotated about a shaft 15 in the direction of the arrow shown in the figure and is lowered as it cuts through the ingot. The first slab or wafer cut from the ingot is generally discarded since it is difficult to control its thickness accurately. It is, therefore, of no consequence whether or not any plastic adheres to the exposed face of the ingot. Fig. 3 shows the saw slicing through the ingot on the second or any subsequent cut, the cut being made transverse to the length of the ingot and along its width and thickness directions. The profile of the ingot 10 and the plastic layer 13 adhering to it can be seen clearly. It will be noted from the figure that as the saw cuts, it first slices into the layer of hardened plastic resin. During the entire cut, the semiconductor material is firmly supported by the layer of plastic. Thus, the plastic layer prevents chipping of the semiconductor as the saw enters the ingot, and no bur is formed at the point of exit of the saw from the semiconductor material, because the sliced wafer is supported by the plastic until after the plastic itself is cut free. In addition, the plastic layer or rind on the wafer absorbs any mechanical shock as the wafer falls into a receptacle. Not only are chipping and burring eliminated, but, most important, the firm support of the semiconductor ingot and wafer by the plastic layer makes it possible to slice the wafer thinner than was heretofore possible, without shattering of the wafer.

Further cuts are made through the coated ingot parallel to the cuts previously made. The ingot is thereby divided into a plurality of thin, flat wafers. Each wafer has two opposite major surfaces which are parallel and planar and define the thickness of the wafer. A rind or layer of plastic is bonded to the peripheral surface of each wafer.

Figure 5:
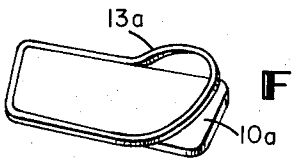

After wafer **10*a* is severed from the ingot, it is placed in a container 20 containing water 21 as is shown in Fig. 4. The rind 13*a*** of plastic slowly absorbs moisture and expands. The water swollen condition of the plastic is evidenced by warping or twisting of the plastic layer and rupture of the bond between the plastic and the semiconductor material as the plastic becomes more pliable. In such condition the plastic is readily removed from the wafer as is illustrated in Fig. 5. The advantages of this method of removing the supporting plastic layer are apparent. It is unnecessary to apply heat to decompose or melt the plastic, or to employ solvents for the coating which poses the problem of further cleaning steps to remove gummy residues.

In sawing wafers from ingots of semiconductor material it is common practice to direct a flow of aqueous coolant over the saw. The present technique contemplates that such a procedure may be employed, and therefore the plastic coating should not absorb moisture at such a rate that the bond between the coating and the ingot is substantially weakened before the entire ingot is subdivided into wafers. However, in view of the much greater surface to volume ratio of the plastic in the thin peripheral bands on the wafers are compared with the corresponding ratio of plastic in the layer on the ingot, ample latitude is permitted for the selection of a plastic having a suitable moisture absorption rate. Desirably the rate of absorption of water by the plastic should be such that from about 1 to 2 hours of soaking of the wafers after separation from the ingot should be required to permit ready removal of the plastic band from the periphery of the wafer. A specific plastic of the required property is hereinafter described. However, by properly adjusting the proportions and types of resins and filler materials of known characteristics, other suitable compositions may be used for the purpose.

Figure 6:
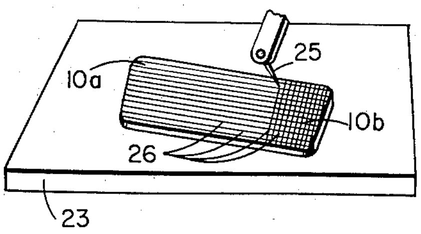
Fig. 6 illustrates a method of further dividing a wafer of semiconductor material into individual dice.

Further processing of the slab or wafer **10*a* of semiconductor material is conducted according to any of various well known techniques. The slab may first be etched chemically to reduce its thickness. It is then mounted with a suitable adhesive on a supporting metal block 23 and subdivided into individual dice 10*b* as by the scribing technique illustrated in Fig. 6. A diamond tipped scribing tool 25 is drawn across one surface of the wafer to inscribe intersecting sets of grooves 26** which define the lateral dimensions of individual dice. The wafer is then broken up along these grooves to produce the individual dice.

Figure 7:
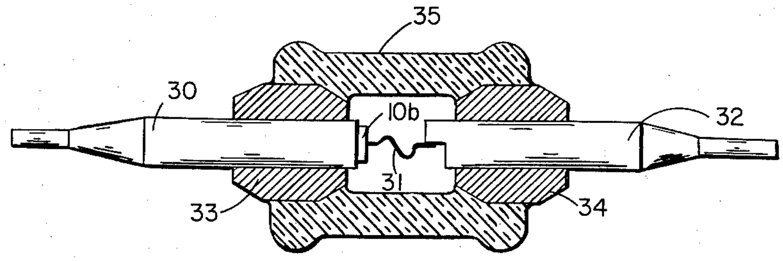
Fig. 7 is a view partially in coss-section of an electrical translator of known construction in which a die of semiconductor material produced according to the method of the invention is utilized as a rectifying element.

After further cleaning and processing steps an individual die of semiconductor material may be incorporated into an electrical translating device of the type shown in Fig. 7. A die **10*b* is mounted on a stud or lead 30. A point contact cat whisker 31 of a suitable material such as, for example, tungsten, is mounted on a second stud or lead 32. These elements are then mounted in a capsule consisting of a glass cylinder 35 and two metal sleeves or collars 33 and 34 hermetically sealed thereto. The studs 30 and 32 are slidably inserted in sleeves 33 and 34, and are soldered in position with the semiconductor die 10*b* and catwhisker 31** in rectifying contact. Electrical translating devices of this type are well known in the semiconductor diode art.

In order that those skilled in the art better may understand how the method of the present invention may be employed, the following typical procedure is described with reference again to the figures of the drawings.

A section of a single crystal doped germanium ingot 10 about 2 inches in length and having a generally trapezoidal cross sectional area of about 1.5 square inches as shown in Fig. 1 was bonded at one end to the mounting block 12 as in Fig. 2. A thin film of the plastic coating hereinafter described was used as the bonding agent for this purpose. The ingot was then dipped into a body of thixotropic plastic of the following composition:

| | Percent |
|---|---|
| Epoxy resin | 36 |
| Precipitated calcium carbonate | 53 |
| Colloidal silica | 2 |
| Aliphatic amine | 9 |

The mixture of the first three components of the plastic material is sold as Stycast 3020–SC by Emerson and Cuming, Inc. of Canton, Massachusetts. The aliphatic amine, sold as Catalyst No. 9, also by Emerson and Cuming, Inc., was added to the other three components of the mixture just prior to the application of the mixture to the ingot. The calcium carbonate was incorporated in the above composition to provide the desired limited rate of moisture absorption in the final cured plastic. The colloidal silica was extremely bulky in nature and increased the thixotropic nature of the composition so that the coating remained in position during the subsequent curing step. The aliphatic amine which was added was capable of cross-linking with the epoxy resin so that the ultimate composition was curable at the low curing temperature employed.

In the dipping operation, immersion of the mounting block was avoided. The ingot itself was covered with a layer of plastic varying from about $\frac{1}{16}$ inch to about $\frac{3}{32}$ inch in thickness.

After the coating had been applied, the ingot was allowed to stand at room temperature (about 22° C.) for about 4 hours. At the end of this period the plastic had cured into a relatively hard layer bonded firmly to the surface of the ingot.

The mounting block bearing the coated ingot was next clamped into a sawing machine (not shown) and a first cut was made adjacent the end of the ingot removed from the mounting block. The extreme end removed by this first cut was discarded, but slices removed by subsequent parallel cuts, as illustrated in Fig. 3, were retained for further processing. The saw shown schematically in Fig. 3 was a commercially available diamond impregnated cutting wheel of 0.020 inch thickness and 6 inches in diameter. It was driven at a speed of 3,000 revolutions per minute and was fed through the ingot at a rate of about $\frac{2}{3}$ inch per minute. The successive cuts through the ingot were made at such intervals as to produce slices of germanium 0.007 inch in thickness. No shattering of slices or chipping or burring were experienced.

After a batch of 70 slices of germanium bearing peripheral bands of plastic coating had been produced in the above manner, they were immersed in a vessel of pure water at substantially room temperature as shown in Fig. 4. After immersion for a period of about 1½ hours, the slices were removed and the plastic coating was readily peeled by hand from the ingot slice as shown in Fig. 5.

After removal of the coating, the slices were immediately ready for the subsequent steps of chemically etching to reduce their thickness still further and the scribing operation to produce dice as mentioned above. However, these subsequent steps are well known in the art and constitute no part of the novel features of the present invention.

It is significant of the advantages of the present invention that in attempts to saw slices of the thickness mentioned in the foregoing illustrative example, but without the use of the water absorbent plastic coating, it was possible to produce only 35 to 40 usable slices from a 60 gram ingot. Under the same conditions, but using the method of the present invention 70 usable slices were obtained from an ingot of the same weight and dimensions.

What is claimed is:

1. The method of producing thin, flat wafers from an ingot of semiconductor material including the steps of coating an ingot with a layer of curable plastic material containing a moisture absorbing constituent, curing said layer of plastic material to a water-insoluble condition in situ on said surface, repeatedly cutting through the coated ingot parallel to an end face of the ingot to separate individual coated wafers from the ingot, exposing the coated wafers to moisture to expand the layer of plastic on each wafer, and subsequently separating the layer of plastic from each wafer.

2. The method of producing thin, flat wafers from an ingot of semiconductor material including the steps of coating surfaces of an ingot with a layer of curable plastic material containing a moisture absorbing constituent, curing said layer of plastic material to a water-insoluble condition in situ on said surface, repeatedly cutting through the coated ingot to produce wafers having a pair of opposite, flat, parallel major surfaces and having peripheral surfaces with a layer of plastic adhering thereto, soaking said wafers in water to expand the layer of plastic and to rupture the bond between the layer and said peripheral surfaces, and subsequently removing said layer from said peripheral surfaces.

3. In the production of electrical translating devices utilizing single crystal semiconductor material the method of producing thin, flat wafers from an ingot of semiconductor material including the steps of coating the surfaces of an ingot generally parallel to its longitudinal axis with a thixotropic, curable plastic containing an epoxy resin and a moisture absorbing filler, curing said plastic in situ on said surfaces to form a hard, water insoluble plastic layer thereon, making a plurality of parallel cuts through said coated ingot generally transverse of said longitudinal axis to produce a plurality of flat wafers each having a layer of plastic adhering to its peripheral surfaces, soaking said wafers in water thereby to cause swelling of the plastic and rupturing of the bonds between the plastic layers and the peripheral surfaces, and subsequently stripping said plastic layers from the wafers.

4. In the production of electrical translating devices utilizing single crystal semiconductor material the method of producing thin, flat wafers from an ingot of semiconductor material including the steps of coating the surfaces of an ingot generally parallel to its longitudinal axis with a thixotropic plastic containing an epoxy resin and a filler comprising calcium carbonate, curing said plastic in situ on said surfaces at room temperature to form a hard, water insoluble plastic layer on said surfaces, sawing repeatedly through said coated ingot generally transverse of said longitudinal axis to produce a plurality of flat wafers each having a layer of plastic adhering to its peripheral surfaces, soaking said wafers in water at room temperature thereby to cause swelling of the plastic and rupturing of the bonds between the plastic layers and the peripheral surfaces, and subsequently stripping said plastic layers from the wafers.

5. In the production of electrical translating devices utilizing single crystal semiconductor material, the method of producing thin, flat wafers from an ingot of single crystal germanium including the steps of dipping the ingot into a thixotropic curable plastic composition comprising an epoxy resin and an aliphatic amine for converting said resin into an infusible, insoluble state, and a filler comprising calcium carbonate and colloidal silica, to coat the surfaces of the ingot lying generally parallel to the longitudinal axis of the ingot with a layer of said plastic composition, curing said layer in situ on said surfaces at room temperature for a period of 4 hours to form a hard plastic layer bonded to said surfaces, generating a plurality of parallel cuts through said coated ingot generally transverse of said longitudinal axis and producing a plurality of flat wafers each having a rind of plastic adhering to its peripheral surfaces, soaking said wafers in water at room temperature for a period of 1½ hours to cause swelling of the plastic and rupturing of the bond between the peripheral surfaces of each wafer and its plastic rind, and subsequently stripping the plastic rind from each of said wafers.

References Cited in the file of this patent

UNITED STATES PATENTS

| | | |
|---|---|---|
| 2,486,560 | Gray | Nov. 1, 1949 |
| 2,588,625 | Ferner | Mar. 11, 1952 |
| 2,752,662 | Crooks | July 3, 1956 |
| 2,810,738 | Slack | Oct. 22, 1957 |